(12) United States Patent
Perkowski et al.

(10) Patent No.: US 7,181,889 B2
(45) Date of Patent: Feb. 27, 2007

(54) SYSTEM AND METHOD FOR FASTENING FLOOR DECK TO SEMI-TRAILER CROSS MEMBERS

(75) Inventors: Michael T. Perkowski, Dover, OH (US); Michael J. Blakely, Dover, OH (US); Michael J. Comella, Dover, OH (US)

(73) Assignee: Platform Products, LLP, Dover, OH (US)

( * ) Notice: Subject to any disclaimer, the term of this patent is extended or adjusted under 35 U.S.C. 154(b) by 0 days.

(21) Appl. No.: 11/208,462

(22) Filed: Aug. 19, 2005

(65) Prior Publication Data

US 2006/0096187 A1  May 11, 2006

Related U.S. Application Data

(60) Provisional application No. 60/625,704, filed on Nov. 5, 2004.

(51) Int. Cl.
*E04F 11/16* (2006.01)

(52) U.S. Cl. ........................ 52/177; 52/650.3

(58) Field of Classification Search ............ 52/177, 52/650.3; 296/182.1, 184.1; 15/238
See application file for complete search history.

(56) References Cited

U.S. PATENT DOCUMENTS

| | | | |
|---|---|---|---|
| 1,913,342 A | | 6/1933 | Schaffert |
| 2,718,288 A | | 9/1955 | Boyer |
| 3,080,021 A | * | 3/1963 | Muir ........................ 52/460 |
| 3,128,851 A | | 4/1964 | Deridder |
| 3,528,391 A | * | 9/1970 | Johnson ..................... 119/529 |
| 3,909,059 A | * | 9/1975 | Benninger et al. ........ 296/184.1 |
| 3,914,913 A | * | 10/1975 | Roberts ..................... 52/475.1 |
| 3,999,346 A | | 12/1976 | Fetherston |
| 4,186,537 A | | 2/1980 | Mountz |
| 4,288,957 A | | 9/1981 | Meehan |
| 4,787,669 A | | 11/1988 | Wante |
| 4,947,595 A | * | 8/1990 | Douds et al. ................ 52/177 |
| 4,951,992 A | | 8/1990 | Hockney |
| 5,048,448 A | * | 9/1991 | Yoder ........................ 114/263 |
| 5,351,990 A | | 10/1994 | Thomas |
| 5,660,016 A | * | 8/1997 | Erwin et al. ................ 52/483.1 |
| 5,950,377 A | | 9/1999 | Yoder |
| 6,082,810 A | | 7/2000 | Bennett |
| 6,301,842 B1 | * | 10/2001 | Chaney et al. ................ 52/177 |

* cited by examiner

*Primary Examiner*—Basil Katcheves
(74) *Attorney, Agent, or Firm*—Porter, Wright, Morris & Arthur, LLP

(57) ABSTRACT

A cargo carrier includes a plurality of laterally extending and longitudinally spaced-apart cross members, a plurality of longitudinally extending decking extrusions supported on the cross members and forming a cargo deck, and retainers securing the decking extrusions to the cross members. The retainers limit or substantially prevent vertical relative movement between the decking extrusions and the cross members. The retainers permit longitudinal relative movement between the decking extrusions and the cross members and at least one end of the decking extrusions is provided with a gap so that the decking extrusions can move in the longitudinal direction to reduce shear stress at the decking connections due to deflection of the decking extrusions, thermal expansion and contraction of the decking extrusions, and the like.

30 Claims, 12 Drawing Sheets

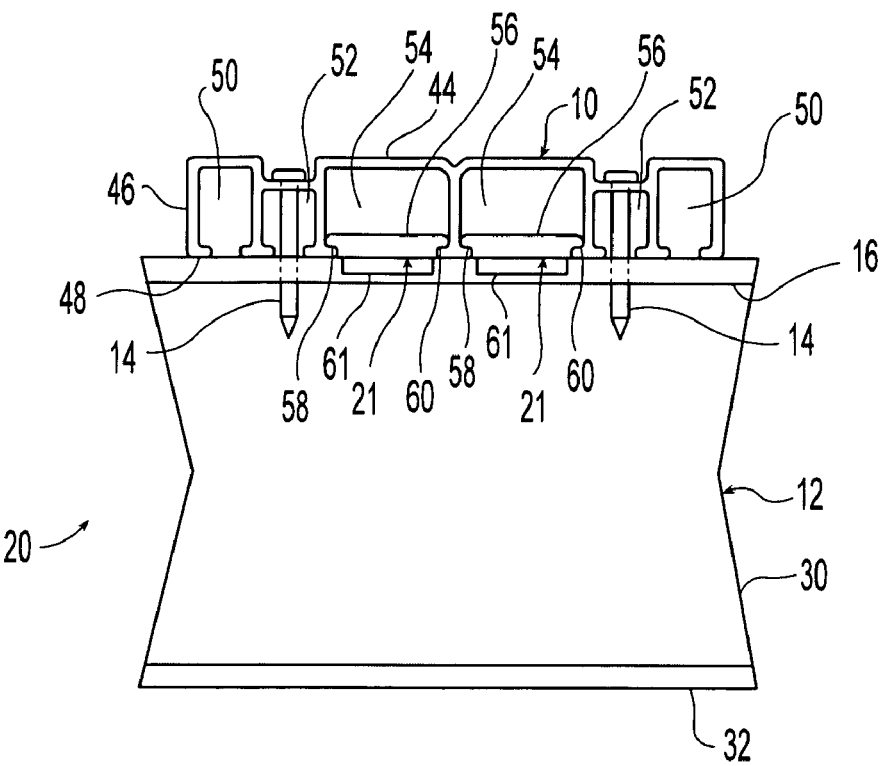
*Fig. 9*
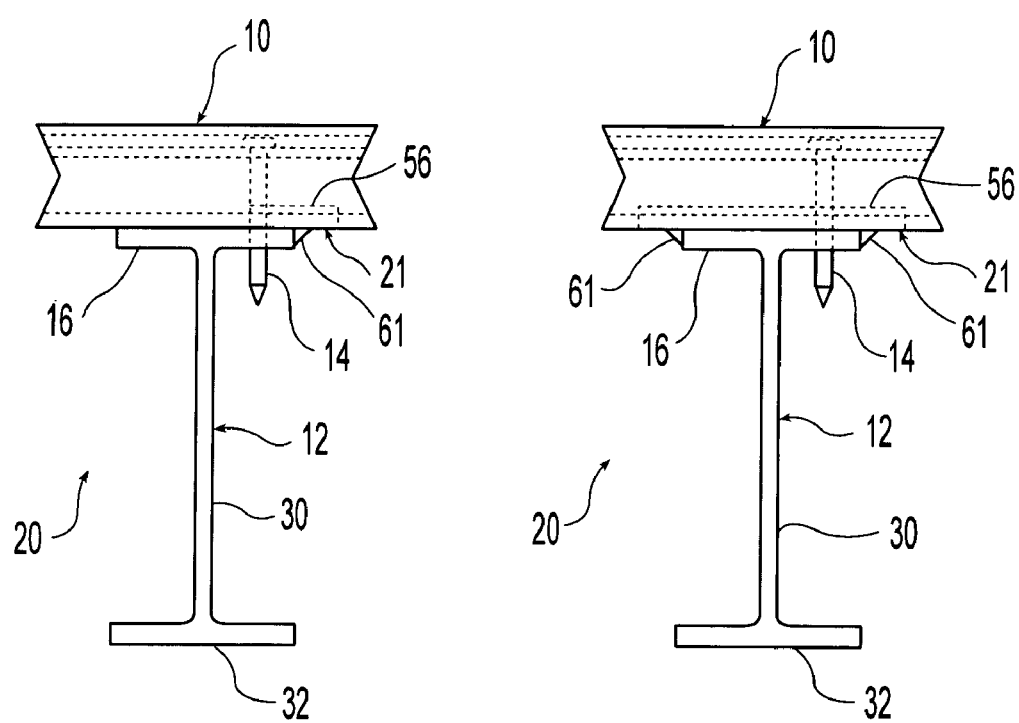
*Fig. 10*  *Fig. 11*

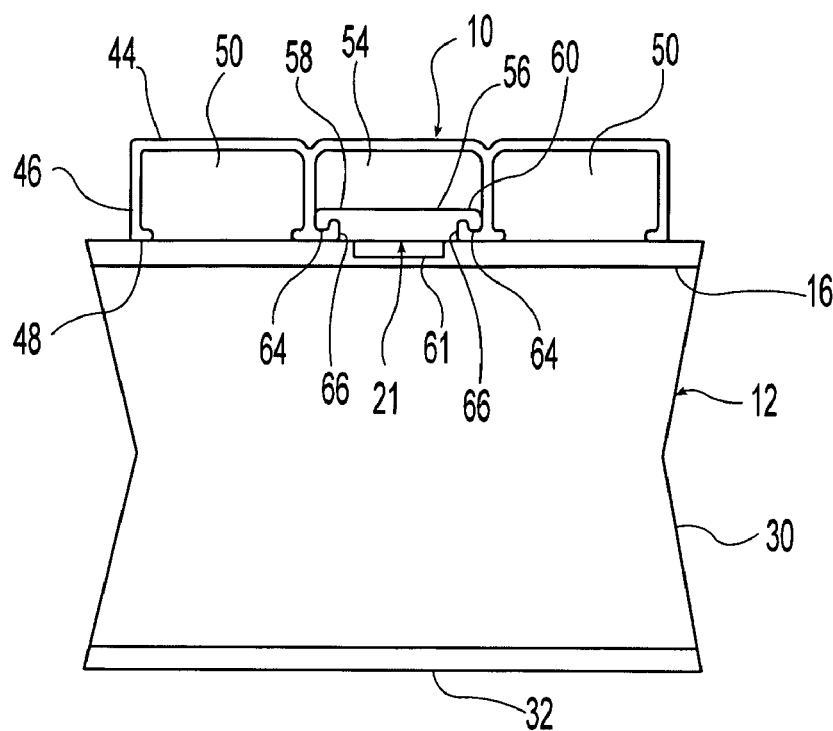
*Fig. 12*
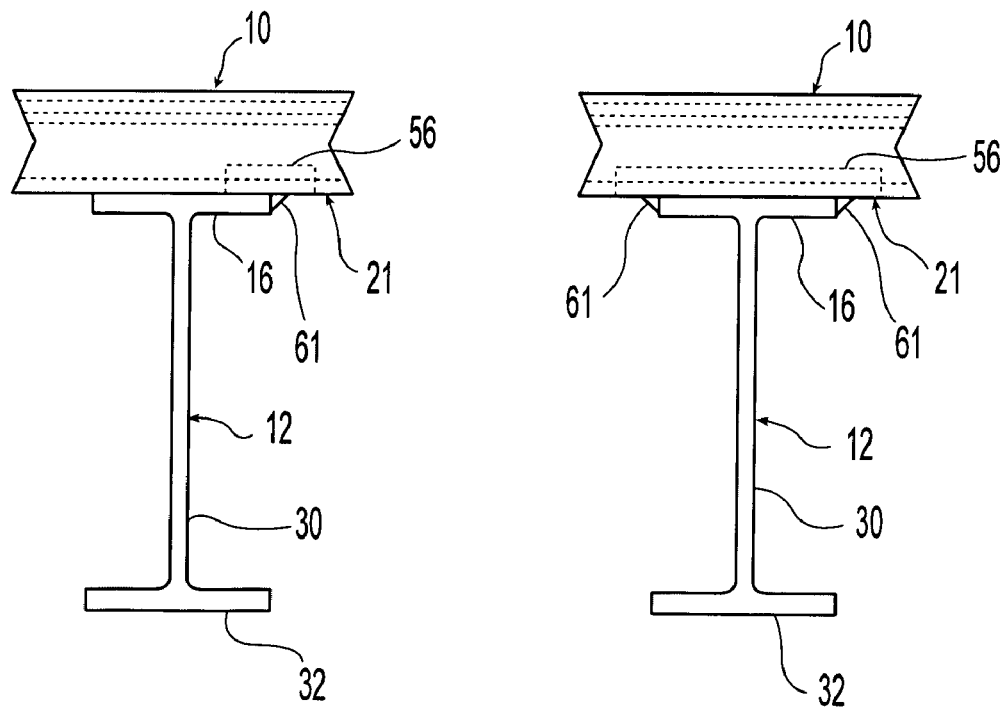
*Fig. 13*  *Fig. 14*

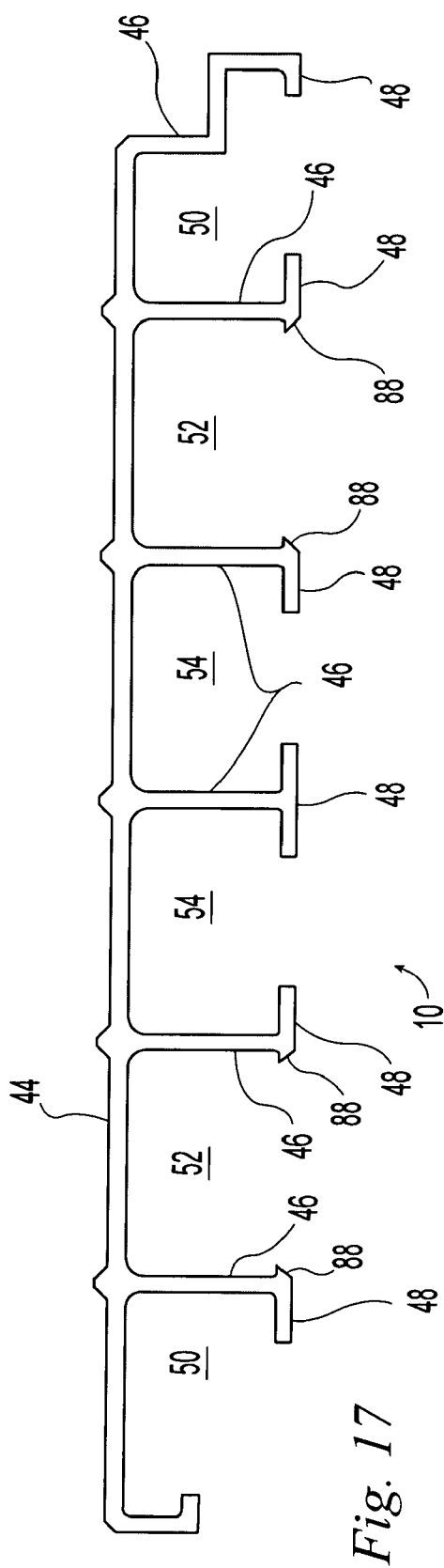
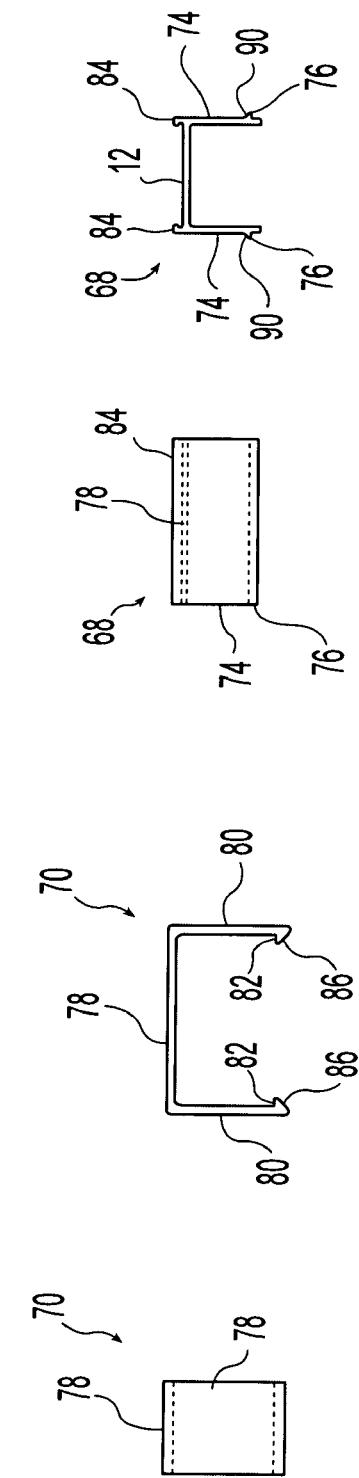
Fig. 17
Fig. 18
Fig. 19
Fig. 20
Fig. 21

SYSTEM AND METHOD FOR FASTENING FLOOR DECK TO SEMI-TRAILER CROSS MEMBERS

CROSS-REFERENCE TO RELATED APPLICATIONS

This application claims priority benefit of U.S. Provisional Patent Application No. 60/625,704 filed on Nov. 5, 2004, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to floor deck of cargo carriers such as, for example, semi-trailers and the like and, more particularly, relates to systems for securing such floor deck to its underlying support structure.

BACKGROUND OF THE INVENTION

Current platform semi-trailers are constructed using a beam and cross member structural system. Two main beams typically span the longitudinal length of the platform (usually forty eight feet) and cross members typically span the transverse width of the platform (usually eight feet or eight feet and six inches). The cross members typically have a spacing of six to twenty-four inches. The main beams and the cross members cooperate to create a grid or support structure for supporting the floor deck of the platform. The floor deck is typically secured to the cross members.

Two categories of platforms are currently produced. Composite platforms have steel main beams and steel or aluminum cross members. Aluminum platforms have aluminum main beams and aluminum cross members.

The floor deck usually includes wood boards, extruded aluminum decking, or a combination of the two. The majority of currently produced platforms utilize extruded aluminum decking with two to four wood boards (typically referred to as "nailers"). The extruded aluminum decking is nearly as long as the platform. Currently, there are two categories of extruded aluminum decking: T-style decking; and multi-hollow decking. T-style decking has two subcategories that may be called nail type and screw type.

As shown in FIGS. 1 and 2, Nail type, T-style decking 10 is fastened to the cross members 12 with powder actuated nails 14. The nails 14 penetrate an upper surface of the extruded aluminum decking 10, pass through a void, and penetrate an upper flange 16 of the cross member 12. The faying surface is separated in this type of connection.

As shown in FIGS. 3 and 4, screw type, T-style decking 10 is fastened to the cross members 12 with screws 18. The screws 18 penetrate the upper surface of the extruded aluminum decking 10 and penetrate the upper flange 16 of the cross member 12. The faying surface is not separated in this type of connection.

As shown in FIGS. 5, and 6, multi-hollow decking is typically used only with aluminum cross members 12. A bottom face of the extruded aluminum decking 10 is welded to the upper flange 16 of the cross member 12 with a fillet weld 19. The fillet weld 19 can be nearly the full width of the extruded aluminum decking 10. The faying surface is not separated in this type of connection.

The primary function of the connection between the floor deck and the cross members is to prevent vertical separation of the floor deck from the platform trailer. Side rails are welded or bolted to ends of the cross members to prevent the floor deck from sliding laterally and separating from the platform trailer. Front and rear ends of the floor deck are enclosed by trailer framing in order to prevent longitudinal separation of the floor deck from the platform trailer.

Many factors contribute to longitudinal movement of the floor deck relative to the cross members. Temperature changes cause the long extruded aluminum decking to expand or contract and change length. Deflection of the main beams force the extruded aluminum decking to bend and move relative to the cross members. This longitudinal movement causes shear forces to occur at the connections of the floor deck. Severe prying forces can be developed when the faying surfaces are separated from the cross members. Due to the long length of the floor deck, these shear forces due to longitudinal movement of the floor deck are much greater than shear forces due to lateral movement of the floor deck. These shear forces due to longitudinal movement can eventually cause the connections to fail. Accordingly, there is a need in the art for an improved system and method for fastening floor deck of a cargo carrier.

SUMMARY OF THE INVENTION

The present invention provides a system and method for fastening floor deck of a cargo carrier which overcomes at least some of the above-noted problems of the related art. According to the present invention, a cargo carrier comprises, in combination, a plurality of laterally extending and longitudinally spaced apart cross members, a plurality of longitudinally extending decking extrusions supported on the cross members and forming a cargo deck, and retainers securing the decking extrusions to the cross members. The retainers limit vertical relative movement between the decking extrusions and the cross members. The retainers permit longitudinal relative movement between the decking extrusions and the cross members and at least one end of the decking extrusions is provided with a gap so that the decking extrusions can move in the longitudinal direction.

According to another aspect of the present invention, a cargo carrier comprises, in combination, a plurality of laterally extending and longitudinally spaced apart cross members, a plurality of longitudinally extending decking extrusions supported on the cross members and forming a cargo deck, and retainers securing the decking extrusions to the cross members. The retainers limit-vertical relative movement between the decking extrusions and the cross members. The retainers permit longitudinal relative movement between the decking extrusions and the cross members and at least one end of the decking extrusions is provided with a gap so that the decking extrusions can move in the longitudinal direction. The retainers each include separate first and second members, the first member is secured to the decking extrusion with a snap-fit connection, and the second member secures the first member to the cross member with a snap fit connection. The first and second members are each extrusions.

According to yet another aspect of the present invention, a platform semi-trailer comprises, in combination, a plurality of laterally extending and longitudinally spaced apart cross members, a plurality of longitudinally extending decking extrusions supported on the cross members and forming a cargo deck, and retainers securing the decking extrusions to the cross members. The retainers limit vertical relative movement between the decking extrusions and the cross members. The retainers permit longitudinal relative movement between the decking extrusions and the cross members and at least one end of the decking extrusions is provided with a gap so that the decking extrusions can move in the longitudinal direction. The retainers each include separate first and second members, the first member is secured to the decking extrusion with a snap-fit connection, and the second member secures the first member to the cross member with a snap fit connection.

From the foregoing disclosure and the following more detailed description of various preferred embodiments it will be apparent to those skilled in the art that the present invention provides a significant advance in the technology and art of systems and methods for fastening floor deck of cargo carriers. Particularly significant in this regard is the potential the invention affords for providing a high quality, reliable, low cost assembly with rapid assembly time. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 9 is an enlarged, fragmented, end elevational view of the floor deck of FIGS. 7 and 8 showing the lock members;

FIG. 10 is an enlarged, fragmented, side elevational view of the floor deck of FIGS. 7 to 9 showing the lock members;

FIG. 11 is a side elevational view similar to FIG. 10 but showing a variation of the lock members;

FIG. 12 is an end elevational view similar to FIG. 9, but showing floor deck with retainers or lock members securing the floor deck to cross members according to a second embodiment of the present invention;

FIG. 13 is a side elevational view of the floor deck of FIG. 12 showing the lock members;

FIG. 14 is a side elevational view similar to FIG. 13 but showing a variation of the lock members;

FIG. 17 is an enlarged, end elevational view of the floor deck of FIGS. 15 and 16;

FIG. 18 is an end elevational view of an outer member of the lock members of FIGS. 15 and 16;

FIG. 19 is a side elevational view of the outer member of FIG. 18;

FIG. 20 is an end elevational view of an inner member of the lock members of FIGS. 15 and 16;

FIG. 21 is a side elevational view of the inner member of FIG. 20;

Figure 1:
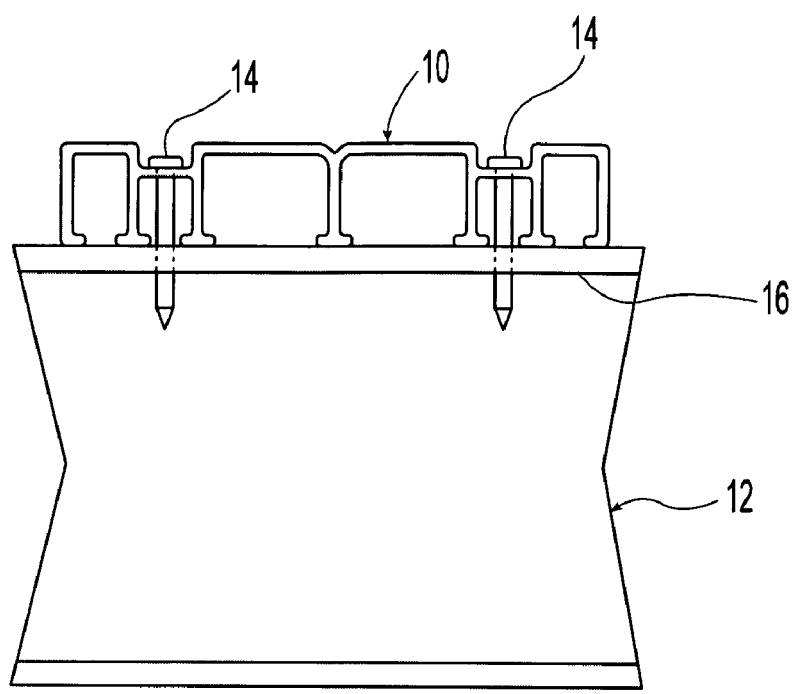
FIG. 1 is a fragmented, end elevational view of prior art floor deck secured with nails to cross members of a semi-trailer.
Figure 2:
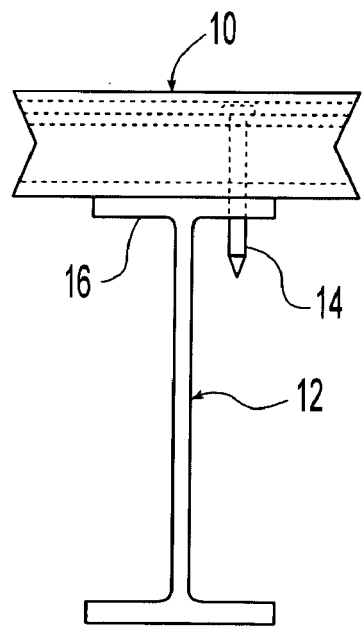
FIG. 2 is a fragmented, side elevational view of the prior art floor deck of FIG. 1.
Figure 3:
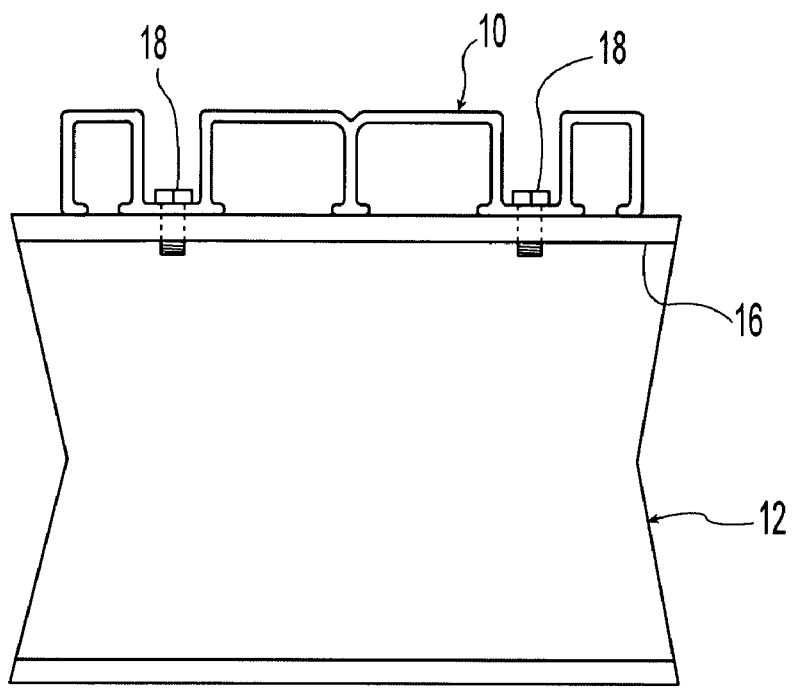
FIG. 3 is a fragmented, end elevational view of prior art floor deck secured with screws to cross members of a semi-trailer.
Figure 4:
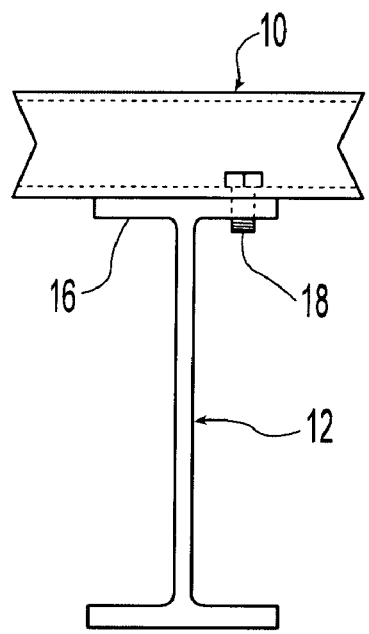
FIG. 4 is a fragmented, side elevational view of the prior art floor deck of FIG. 3.
Figure 5:
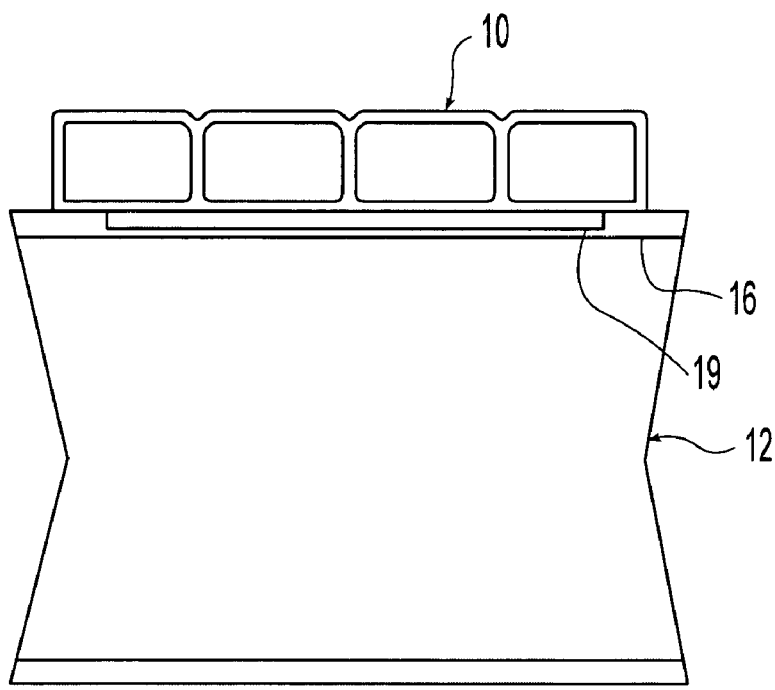
FIG. 5 is a fragmented, end elevational view of prior art floor deck secured with fillet welds to cross members of a semi-trailer.
Figure 6:
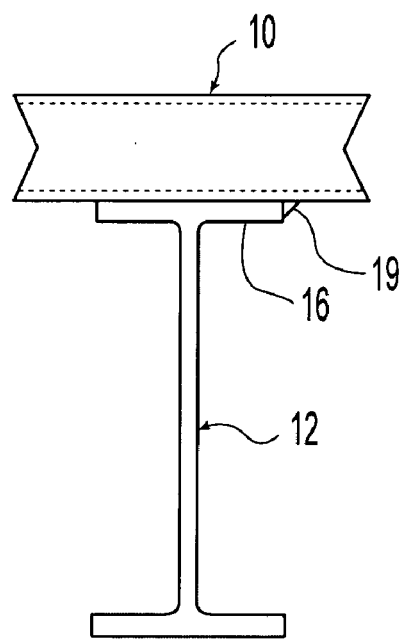
FIG. 6 is a fragmented, side elevational view of the prior art floor deck of FIG. 5.
Figure 7:
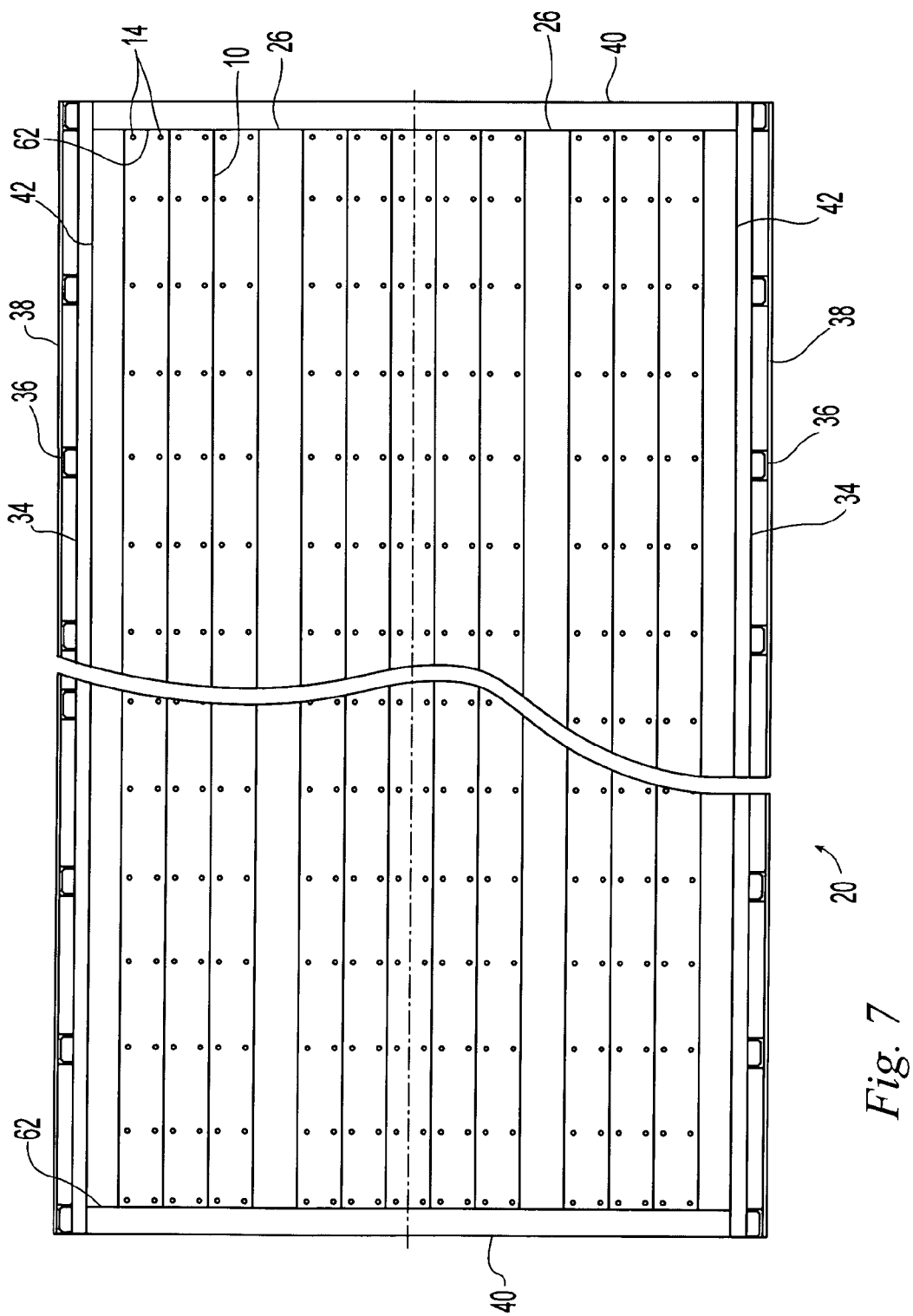
FIG. 7 is a top plan view of floor deck of a semi-trailer which has been retrofitted with retainers or lock members securing the floor deck to cross members according to a first embodiment of the present invention.
Figure 8:
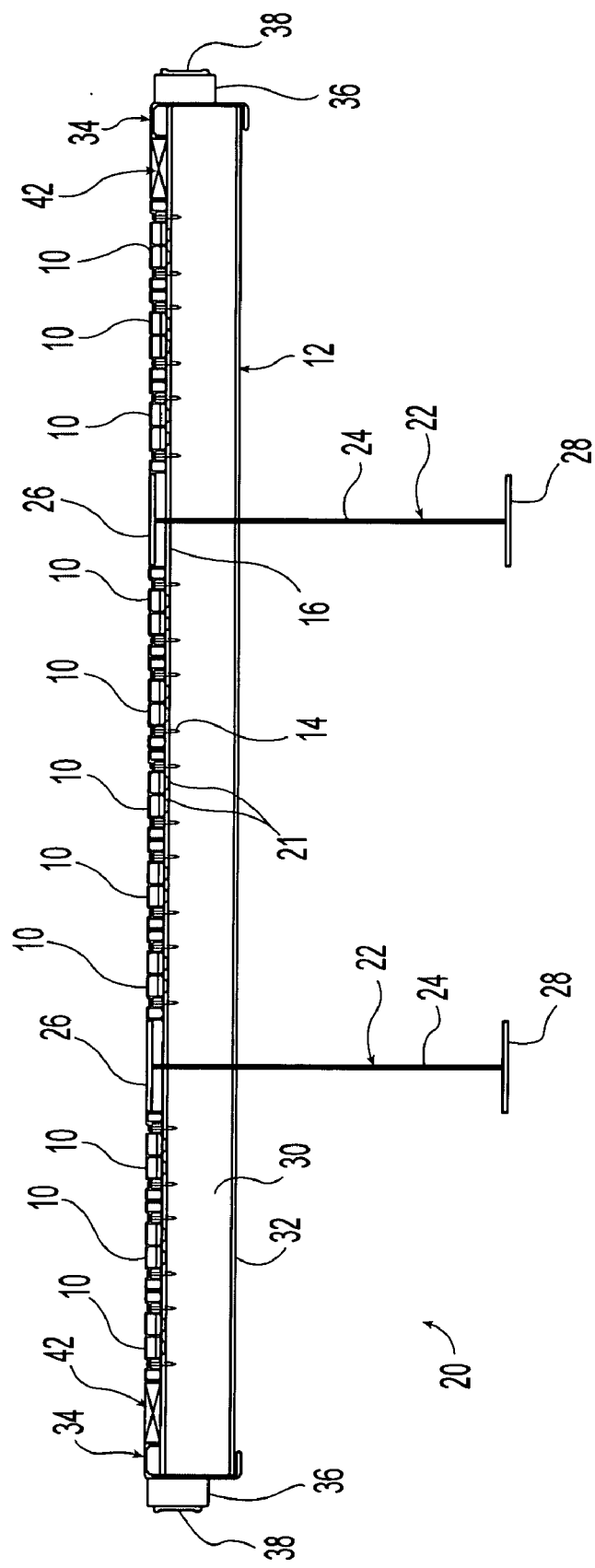
FIG. 8 is an end elevational view of the floor deck of FIG. 7, wherein some components are removed for clarity.
Figure 15:
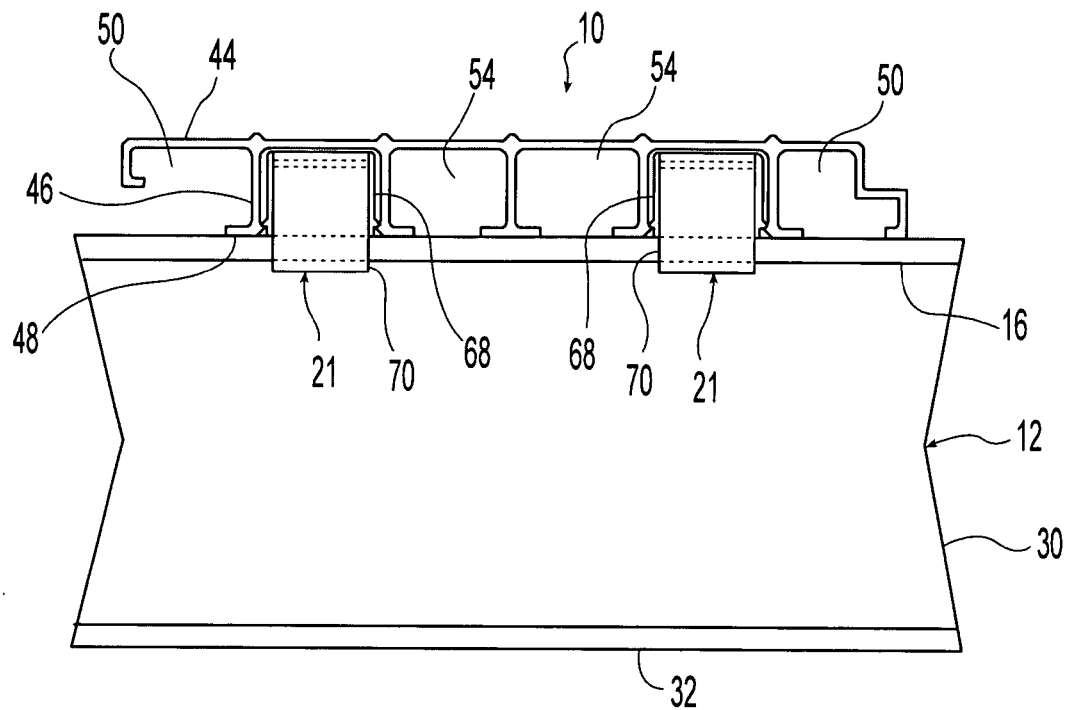
FIG. 15 is an end elevational view similar to FIGS. 9 and 12, but showing floor deck with retainers or lock members securing the floor deck to cross members according to a third embodiment of the present invention.
Figure 16:
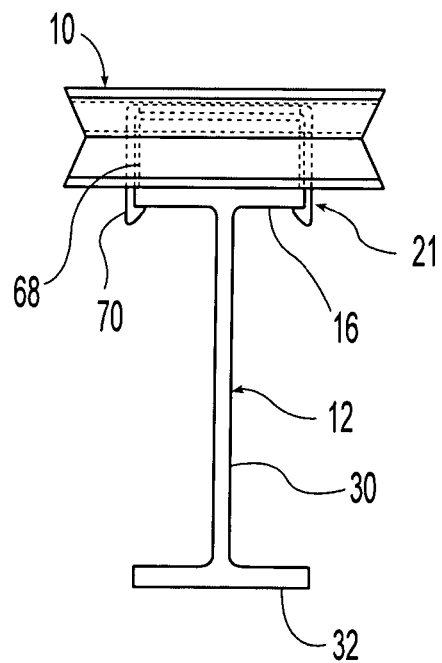
FIG. 16 is a side elevational view of the floor deck of FIG. 15 showing the lock members.
Figure 22:
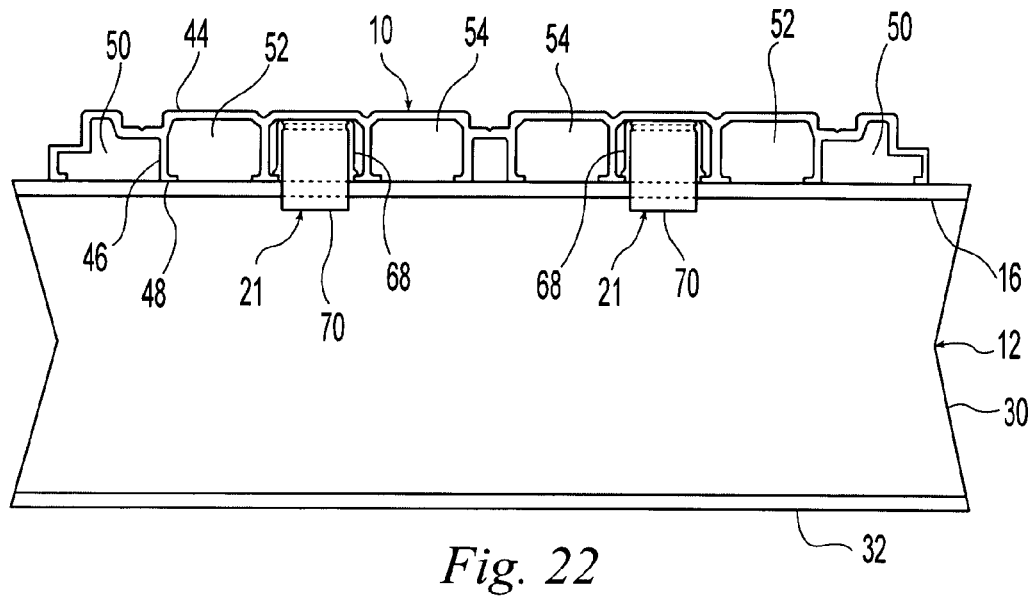
FIG. 22 is an end elevational view similar to FIGS. 9, 12 and 15, but showing floor deck with retainers or lock members securing the floor deck to cross members according to a fourth embodiment of the present invention.
Figure 23:
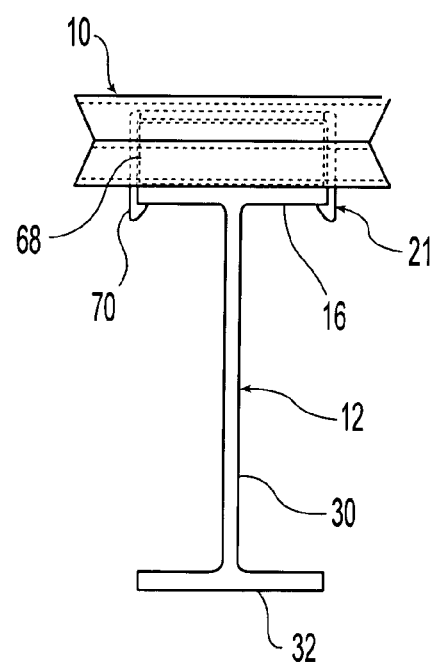
FIG. 23 is a side elevational view of the floor deck of FIG. 22 showing the lock members.
Figure 24:
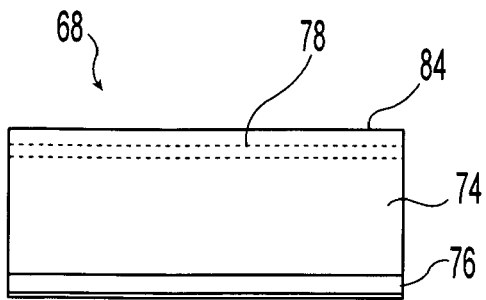
FIG. 24 is an end elevational view of an inner member of the lock members of FIGS. 22 and 24.
Figure 25:
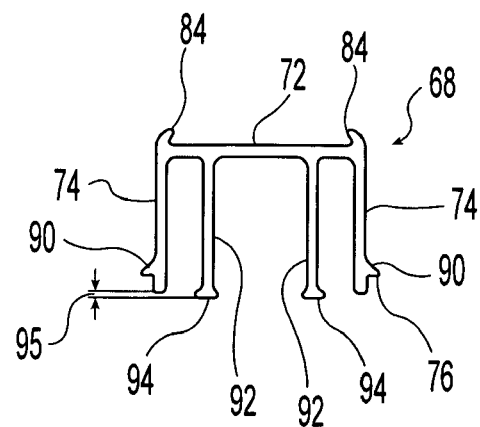
FIG. 25 is a side elevational view of the inner member of FIG. 24.

It should be understood that the appended drawings are not necessarily to scale, presenting a somewhat simplified representation of various preferred features illustrative of the basic principles of the invention. The specific design features of the system and method for fastening floor deck of a cargo carrier as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the system and method for fastening floor deck of a cargo carrier illustrated in the drawings. In general, up or upward generally refers to an upward direction within the plain of the paper in FIGS. 1, 5, 8, 11, 18, and 22 and down or downward generally refers to a downward direction within the plane of the paper in FIGS. 1, 5, 8, 11, 18, and 22. Also in general, fore or forward refers to a direction toward the front of the cargo carrier, that is, generally toward the right within the plane of the paper in FIG. 7 and aft or rearward refers to a direction toward the rear of the cargo carrier, that is, generally toward the left within the plane of the paper in FIG. 7. Also in general, lateral or transverse refers to a side to side direction of the cargo carrier, that is, generally up and down within the plane of the paper in FIG. 7.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved system and method for fastening floor deck of a cargo carrier disclosed herein. The following detailed discussion of various alternative and preferred embodiments will illustrate the general principles of the invention with reference to a system and method for fastening floor deck of a cargo carrier such as a platform semi-trailer. Other embodiments suitable for other applications, such as any other suitable type of trailers, trucks, locomotive cars, ships, planes, and the like having decking supported by structural members will be apparent to those skilled in the art given the benefit of this disclosure.

Referring now to the drawings, FIGS. 7 to 10 illustrate a system and method for fastening floor deck according to a preferred embodiment of the present invention. The illustrated cargo carrier 20 has been retrofitted according to the present invention so that the nail type decking 10 is secured by a plurality of inserts or retainers 21 in addition to the nails 14 which initially secured the decking 10. Retrofitted in the manner, the retainers 21 secure the decking 10 in a desired manner even if the nails 14 fail or have failed due to shear stress created by longitudinal movement of the decking 10. This cargo carrier 20 illustrates that existing fleets can be retrofitted to obtain benefits of the present invention. It is noted that the cargo carrier 20 can alternatively be newly constructed according to the present invention wherein the nails 14 are not needed and can be eliminated if desired.

The illustrated cargo carrier 20 includes a pair of parallel and laterally spaced-apart main beams 22. The illustrated main beams 22 span the longitudinal length of the cargo carrier 20. The illustrated longitudinal length is about 48 feet but any other suitable length can be utilized. The illustrated main beams 22 are I-beams having, in cross-section a main web or wall 24 and upper and lower flanges 26, 28 at the top and bottom of the main web. It is noted that the main beams 22 can alternatively have any other suitable shape. The main beams 22 can comprise any suitable material such as, for example, steel, aluminum, or the like.

A plurality of parallel and longitudinally spaced-apart cross members 12 are secured to the main beams 22 to create a grid or support structure for supporting the floor deck or decking 10. The cross members 12 can be secured to the main beams 22 in any suitable manner. The illustrated cross members 12 span the transverse width of the platform which is preferably about eight feet to about eight feet and six inches. The cross members preferably have a longitudinal spacing of about six to about twenty-four inches but any other suitable spacing can be utilized. The illustrated cross-members 12 are I-beams having, in cross-section a main web or wall 30 and upper and lower flanges 16, 32 at the top and bottom of the main web 30. It is noted that the cross members 12 can alternatively have any other suitable shape. The cross members 12 can comprise any suitable material such as, for example, steel, aluminum, or the like. The decking 10 is secured to the cross members 12 as described in more detail hereinafter. The illustrated cross members 12 are positioned at a height below the upper flanges 26 of the main beams 22 so that the top surfaces of the decking 10 are generally flush with the main beam upper flanges 26. It is noted, however, that the cross members 12 can alternatively be positioned relative to the main beams 22 in any other suitable manner.

The illustrated cargo carrier 20 includes side rails 34 secured to the ends of the cross members 12. The illustrated side rails 34 extend the longitudinal length of the cargo carrier 20. The side rails 34 can be secured to the cross members 12 in any suitable manner such as, for example, welding, mechanical fasteners, or the like. The side rails 34 can comprise any suitable material such as, for example, steel, aluminum, or the like. The illustrated side rails 34 are generally C-shaped in cross-section and receive the ends of the cross members 12 therein so that upper surfaces of the side rails 34 are generally flush with the decking 10 and the main beam upper flanges 26. The illustrated side rails 34 have a plurality of longitudinally spaced-apart stake pockets 36 secured to an outer side thereof and rub rails secured to the outer sides of the stake pockets 36. The stake pockets 36 and the rub rails 38 can be secured in any suitable manner such as, for example, welding, mechanical fasteners, or the like. The stake pockets 36 and the rub rails 38 can comprise any suitable material such as, for example, steel, aluminum, or the like.

The illustrated cargo carrier 20 includes end or nose and tail beams 40 secured to the ends of the main beams 22. The illustrated nose and tail beams 40 extend the entire lateral width between the side rails 34 of the cargo carrier 20. The nose and tail beams 40 can be secured to the main beams 22 and the side rails 34 in any suitable manner such as, for example, welding, mechanical fasteners, or the like. The nose and tail beams 40 can comprise any suitable material such as, for example, steel, aluminum, or the like. The illustrated nose and tail beams 40 are positioned so that upper surfaces of the nose and tail beams 40 are generally flush with the decking 10 and the main beam upper flanges 26.

The deck or floor of the illustrated cargo carrier 20 is formed by the two main beam upper flanges 26, two wood nailers 42, the top surfaces of the side rails 34, and eleven extrusions of the decking 10. It is noted that alternatively any other suitable combination and/or quantities can be utilized such as, for example, a greater or fewer number of the nailers 42 can be utilized and/or the nailers 42 could be eliminated. The illustrated main beam upper flanges 26, wood nailers 42, side rails 34, and decking 10 extend the entire longitudinal length between the nose and tail beams 40 and are positioned side by side to form a generally continuous upper surface for supporting cargo thereon. The nailers 42 can be secured to the cross members 12 in any suitable manner such as, for example, mechanical fasteners like screws or the like. The nailers 42 can comprise any suitable material such as, for example, wood or the like.

The illustrated decking 10 are aluminum extrusions but it is noted that the decking can alternatively be formed in any other suitable manner and can comprise any other suitable material. The illustrated decking 10 includes, in cross-section, a horizontally-extending top flange 44, a plurality of vertically-extending support webs or walls 46 spaced-apart along the width of the top flange 44 to form a plurality of pockets, and a plurality of horizontally extending bottom flanges 48 at the lower ends of the support walls 46 to support the decking 10 on the cross members 12. The illustrated decking 10 includes seven support walls 46 that form six pockets including a pair of outer pockets 50, a pair of intermediate pockets 52, and a pair of inner pockets 54. It is noted that any other suitable number of support walls 46 can alternatively be utilized to form any other suitable number of pockets.

The illustrated decking is supported on the cross members 12 with the flanges 48 directly engaging the upper flange 16 of the cross members 12. The illustrated decking 10 is secured to the cross members 12 by the nails 14 which extend through the top flange 44 and the intermediate pockets 52, to the upper flange 16 of the cross members. Such connections are typically provided for each of the decking 10 at each of the cross members 12. It is noted that the nails 14 are present because the illustrated embodiment is a retrofit of an existing cargo carrier 20 already having nails 14 present and it is not necessary to remove the nails 14. It should be appreciated that the nails 14 can be eliminated in a new construction and/or retrofit if desired.

The illustrated decking 10 is also secured to the cross members 12 by the inserts or retainers 21. The illustrated decking 10 is secured by two of the retainers 21 at each of the cross members 12. It is noted, however, that other suitable quantities and locations of the retainer 21 can alternatively be utilized. The illustrated retainers 21 are sized and shaped to extend into the inner pockets 54 of the decking 10 and interlock with the flanges 48 of the decking 10 at the inner pockets 54. It is noted, however, that other suitable sizes and shapes can alternatively be utilized. The illustrated retainers 21 have a rectangular-shaped main body 56 and left and right upper flanges 58, 60 which are sized to laterally extend over the decking flanges 48 when the retainer 21 is engaging the upper flange 16 of the cross member 12. The illustrated retainers 21 longitudinally extend over edges of the cross member upper flanges 16 in a cantilevered manner and are secured to the cross members 12 by a fillet weld 61. It is noted, however, that the retainers 21 can be secured to the cross members 12 in any other suitable manner such as, for example, mechanical fasteners, adhesives, snap-fit connections, or the like. The illustrated retainers 21 are aluminum extrusions but it is noted that the retainers 21 can alternatively be formed in any other suitable manner and can comprise any other suitable material.

The retainer flanges 58, 60 are sized to engage the decking flanges 48 to limit or substantially prevent vertical movement of the decking 10 relative to the cross member 12, to limit or substantially prevent lateral movement of the decking 10 relative to the cross-member 12, and to freely permit longitudinal movement of the decking 10 relative to the cross member. It is noted that while the illustrated retainers 21 allow unlimited longitudinal movement of the decking 10 relative to the cross members 12, the decking 10 is retained to the cargo carrier 20 in the longitudinal direction by the nose and tail beams. Suitable gaps 62 are provided between the decking 10 and the nose and tail beams 40 to permit longitudinal movement of the decking 10 as needed to substantially reduce and/or eliminate shear stress in the decking connection due to longitudinal movement of the decking 10. The illustrated gaps 62 are each about 3/16 of an inch. The gaps 62 are preferably provided at both ends of the decking 10 but alternatively can be provided at only one of the longitudinal ends. Thus, the retainers 21 are rigidly secured to the cross members 12 and are interlocked with the decking 10 to secure the decking 10 to the cross members 12 in a manner which permits the decking 10 to freely move in the longitudinal direction relative to the cross members 12 while limiting and/or substantially preventing the decking 10 from moving in the vertical direction relative to the cross members 12 and limiting or substantially preventing the decking 10 from moving in the lateral direction relative to the cross members 12. It is noted that illustrated adjacent ones of the decking 10 are not secured together other than through the separate retainers 21 and the cross members 12 to allow the decking 10 to independently move. It is also noted that the illustrated ones of the retainers 21 are not secured together and each retainer engages and secures only one of the decking extrusions 10.

FIG. 11 illustrates a variation of the retainers 21 of the first embodiment, wherein the retainers 21 longitudinally extend over both edges of the cross member upper flanges 16 in a cantilevered manner and are secured to the cross members 12 by fillet welds 61 at each edge of the cross members 12. It is believed that this variation provides a stronger connection between the retainers 21 and the cross members 12.

FIGS. 12 and 13 illustrate a second embodiment of the present invention. This second embodiment is substantially the same as the first embodiment described above except as describe below and like reference numbers are used to indicate like structure. The second embodiment illustrates that cargo carrier 20 can be a new construction rather than a retrofit so that the nails 14 or other deck fasteners are not present, that the decking 10 can have other suitable shapes and sizes and that the retainers 21 can have other suitable shapes and sizes. The illustrated decking 10 of the second embodiment has four support walls 46 that form three pockets including a pair of outer pockets 50, and a single inner pocket 54. It is noted that any other suitable number of support walls 46 can alternatively be utilized to form any other suitable number of pockets. The illustrated decking 10 is secured by a single one of the retainers 21 at each of the cross members 12 and located in the inner pocket 54. It is noted, however, that other quantities of the retainer 21 can alternatively be utilized. The retainer 21 and the decking flanges 48 are also shaped to form a lateral interlock in addition to the vertical interlock. The illustrated lateral interlock is formed by the retainer left and right flanges 58, 60 being provided with downwardly extending flange portions 64 at their outer edges and the decking flanges 48 being provided with upwardly-extending flange portions 66 at their inner edges.

FIG. 14 illustrates a variation of the retainers 21 of the second embodiment, wherein the retainers 21 longitudinally extend over both edges of the cross member upper flanges 16 in a cantilevered manner and are secured to the cross members 12 by fillet welds 61 at each edge of the cross members 12. It is believed that this variation provides a stronger connection between the retainers 21 and the cross members 12.

FIGS. 15 to 21 illustrate a third embodiment of the present invention. This third embodiment is substantially the same as the first and second embodiments described above except as described below and like references numbers are used to indicate like structure. The third embodiment illustrates that the decking 10 can have other suitable shapes and sizes and that the retainers 21 can have other suitable shapes and sizes. The illustrated decking 10 of the third embodiment has seven support walls 46 that form six pockets including a pair of outer pockets 50, a pair of intermediate pockets 52, and a pair of inner pockets 54. It is noted that any other suitable number of support walls 46 can alternatively be utilized to form any other suitable number of pockets. The outermost support walls 46 are also sized and shaped so that adjacent decking 10 overlap in the lateral direction. The illustrated decking 10 is secured by a pair of the retainers 21 at each of the cross members 12 and located in the intermediate pockets 52. It is noted, however, that other quantities and locations of the retainer 21 can alternatively be utilized.

The illustrated retainers 21 of the third embodiment comprise a first or lower member 68 and a separate second or upper member 70. It is noted, however, that these retainers 21 with the snap-fit connections described below can alternatively be formed as a single component or more components. The illustrated first retainer member 68 is sized and shaped to be secured to the decking flanges 48 with a snap-fit connection while the second member 70 is sized and shaped to be secured to the cross-member 12 with a snap-fit connection while retaining the first retainer member 68 to the cross member 12. The term "Snap-fit connection" is used in this specification and the claims to mean a connection between two separate components wherein the two components are moved toward one another during assembly such that at least a portion of one or both of the components resiliently deflects as the components are brought together to eliminate an interference therebetween and resiliently reestablish the interference once the components are moved past the interference to secure the components together in the direction of the interference. The illustrated first member 68 is generally inverted-U-shaped in cross-section having a top wall 72 and a pair of side walls 74 downwardly extending from outer edges of the top wall 72. Protrusions 76 are provided at the outside of the lower end of the side walls 74. The protrusions 76 are sized and shaped to cooperate with the flanges 48 of the decking 10 to limit and/or prevent vertical movement of the decking 10 relative to the cross member 12. The illustrated first members 68 are aluminum extrusions but it is noted that the first members 68 can alternatively be formed in any other suitable manner and can comprise any other suitable material.

The illustrated second member 70 is generally inverted-U-shaped in cross-section having a top wall 78 and a pair of side walls 80 downwardly extending from outer edges of the top wall 78. Inwardly-extending protrusions 82 are provided at the inside of the lower end of the side walls 80. The protrusions 82 are sized and shaped to cooperate with the upper flange 16 of the cross member to limit and/or prevent vertical and longitudinal movement of the second member 70 relative to the cross member 12. Because the second member 70 is sized to closely extend over the first member 68, this also limits and/or prevents vertical and longitudinal movement of the first member 68 relative to the cross member 12. The outer sides of the first member top wall 72 is provided with protrusions or flanges 84 sized and shaped to limit and/or prevent lateral relative movement between the first and second members 68, 70. The second members 70 have a length that closely fits between the flanges 84 within the first member 68. The illustrated second members 70 are aluminum extrusions but it is noted that the second members 70 can alternatively be formed in any other suitable manner and can comprise any other suitable material.

The decking 10 is preferably installed by first securing the retainers 21 to the cross members 12 by snapping the second members 70 onto the cross members 12 over the first members 68. The second members are oriented 90 degrees to the first members. As the second members 70 are forced downwardly over the upper flange 16 of the cross member 12, the side walls 80 deflect outwardly so that the protrusions 82 pass over the upper flange 16 and then resiliently snap back once the protrusions 82 are located below the upper flange 16 to form a vertical interlock between the second member 70 and the cross member 12. It is noted that the lower side of the illustrated protrusions 82 are provided with an angled camming surface 86 to ease installation of the second members 70. The decking 10 is then snapped onto the first members 68. As the decking 10 is forced downwardly over the retainers 21, the support walls 46 adjacent the retainers 21 deflect outwardly so that the flanges 48 pass over the protrusions 76 and then resiliently snap back once the flanges 48 are located below the protrusions 76 to form a vertical interlock between the first member 68 and the decking 10. It is noted that the side walls 74 may also resiliently deflect inwardly as the flanges 48 pass the protrusions 76. It is noted that the lower side of the illustrated flanges 48 are provided with an angled camming surface 88 to ease installation of the decking. It is also noted that the upper side of the illustrated protrusions 76 are provided with an angled camming surface 90 to further ease installation of the decking 10. Installed in this manner, the decking 10 can be quickly installed by the retainers 21 without the use of mechanical fasteners or welds to obtain the desired connection that freely permits longitudinal movement of the decking 10 relative to the cross members 12 as described hereinabove.

FIGS. 22 to 25 illustrate a fourth embodiment of the present invention. This fourth embodiment is substantially the same as the third embodiment described hereinabove except as described hereinbelow and like references numbers are used to indicate like structure. The fourth embodiment illustrates that the decking 10 can alternatively have other suitable shapes. The fourth embodiment also illustrates the first member 68 of the retainer 21 can have other suitable shapes and sizes. The illustrated first member 68 of the fourth embodiment includes a pair of laterally spaced-apart legs or walls 92 downwardly extending from the top wall 72 between the side walls 74. The illustrated legs 92 are substantially parallel to one another and the side walls 74. The lower end of the illustrated legs are provided with flanges 94 to support the first member 68 on the cross member upper flange 16. The legs 92 preferably have a vertical length which is greater than the vertical length of the side walls 74 (shown at 95) so that the side walls 74 more easily deflect in an inward direction during installation of the decking over the retainers 21 and thus reducing the force required to resiliently snap the decking 10 onto the retainers 21.

Figure 26:
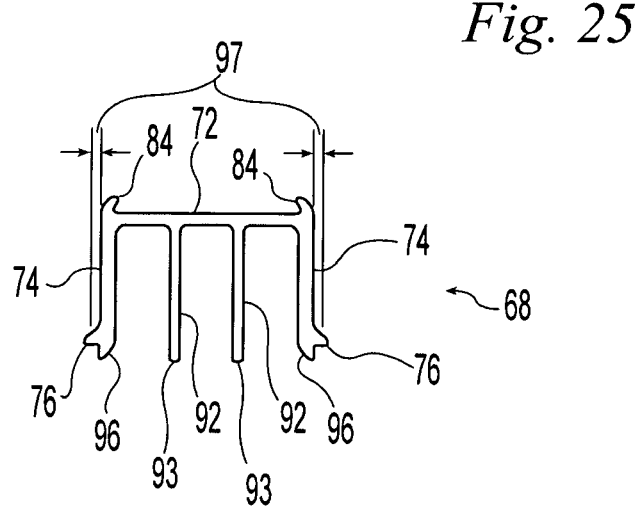
FIG. 26 is a side elevational view similar to FIG. 25 but showing a variation of the inner member.
Figure 29:
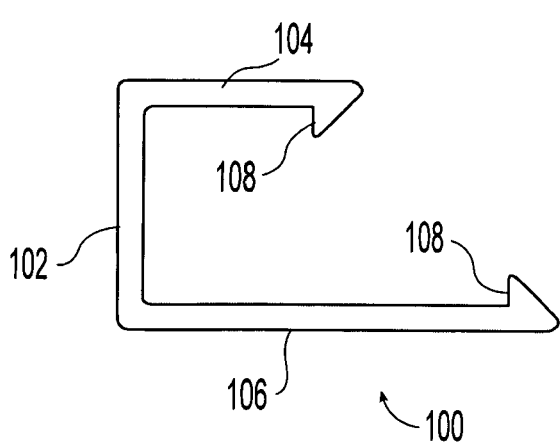
FIG. 29 is an end elevational view of an outer member of the lock members of FIGS. 27 and 28.
Figure 30:
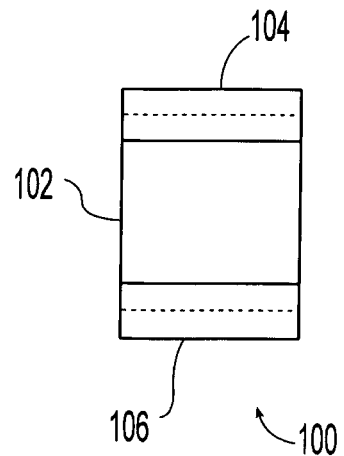
FIG. 30 is a side elevational view of the outer member of FIG. 29.
Figure 27:
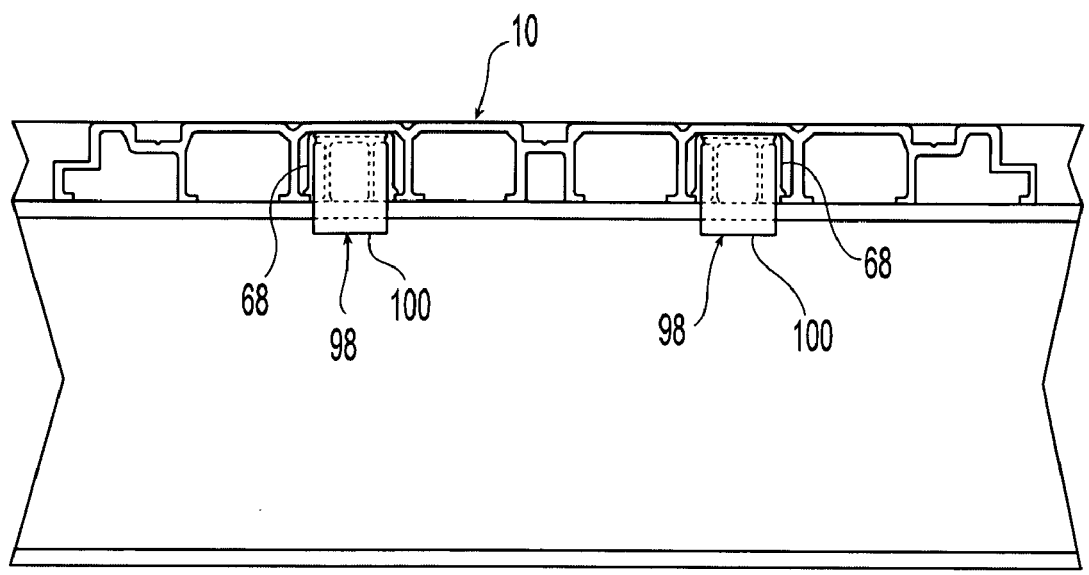
FIG. 27 is an end elevational view showing floor deck with retainers or lock members securing the floor deck to an end beam according to the present invention.
Figure 28:
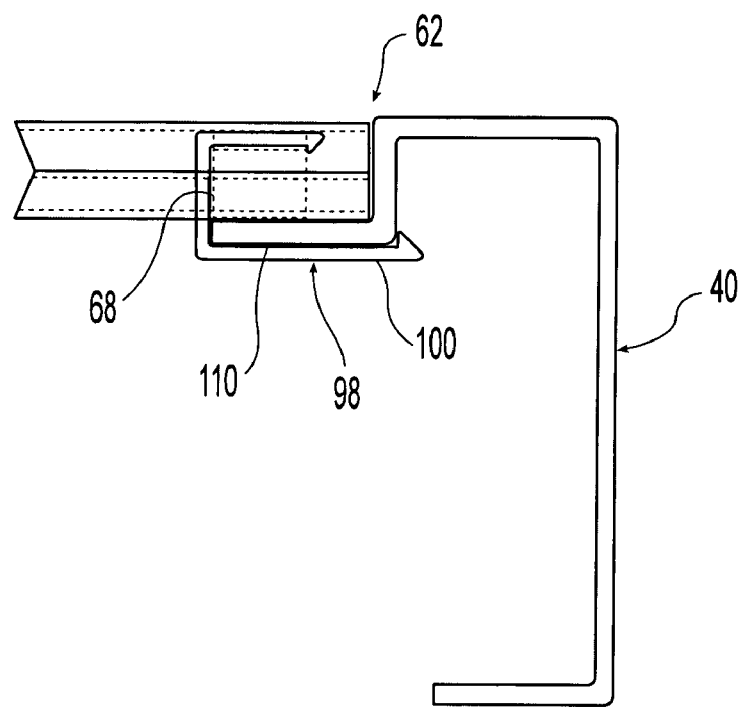
FIG. 28 is a side elevational view of the floor deck of FIG. 27 showing the lock members.

FIG. 26 illustrates a variation of the inner member 68 of the fourth embodiment, wherein the lower inner edge of the side walls 74 are provided with an angled surface or chamfer 96, the lower end of the legs 92 are rounded 93 and an offset 97 is provided between the outer surface of the side walls 74 above the protrusions 76 and the outer surface of the side walls 74 below the protrusions 76. The angled surface or chamfer 96 helps to reduce the weight of the inner member 68. The rounded ends of the legs 92 aid the lateral movement of the inner member 68 when the decking 10 is being installed. The offset 97 allows for easier engagement of the retainer 21 by the decking 10 during installation.

FIGS. 27 to 30 illustrate that the decking 10 can also be secured to the nose and tail beams 40 using snap-fit retainers 98 similar to the retainers 21 securing the decking 10 to the cross members 12 as described above. The illustrated retainers 98 include a first or lower member 68 substantially the same as that described above and a second or outer member 100. The illustrated outer member 100 is generally lazy or sideways U-shaped in cross-section having a side wall 102 and upper and lower walls 104, 106 outwardly extending from upper and lower edges of the side wall 102. Inwardly-extending protrusions 108 are provided at the inside of the outer ends of the upper and lower walls 104, 106. The protrusions 108 are sized and shaped to cooperate with the top wall 72 of the first member 68 and a flange 110 of the nose or tail beam 40 to limit and/or prevent vertical and longitudinal movement of the second member 100 relative to the nose or tail beam 40. Because the second member 100 is sized to closely extend over the first member 68, this also limits and/or prevents vertical and longitudinal movement of the first member 68 relative to the nose or tail beam 40. The flanges 84 of the first member top wall 72 limit and/or prevent lateral relative movement between the first and second members 68, 100. The second members 100 have a length that closely fits between the flanges 84 within the first member 68. The illustrated first and second members 68, 100 are aluminum extrusions but it is noted that the they can alternatively be formed in any other suitable manner and can comprise any other suitable material. The retainer is installed in a manner similar to the method described hereinabove with regard to the retainer 21 for the cross members 12.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A cargo carrier comprising, in combination:
a plurality of spaced apart cross members;
a plurality of decking extrusions supported on the cross members and extending perpendicular to the cross members to form a cargo deck;
retainers securing the decking extrusions to the cross members;
wherein the retainers limit vertical relative movement between the decking extrusions and the cross members;
wherein the retainers permit movement of the decking extrusions relative to the cross members in a longitudinal direction of the decking extrusions;
wherein the cross members, the decking extrusions, and the retainers are formed as separate components;
wherein the decking extrusions are secured to the retainers; and
wherein said retainers are secured to the cross members with a snap fit connection.

2. The cargo carrier according to claim 1, wherein said retainers are extrusions.

3. The cargo carrier according to claim 1, wherein said retainers are directly secured to the cross members.

4. The cargo carrier according to claim 1, wherein said retainers form an interlock with flanges of the extrusions in the vertical direction.

5. The cargo carrier according to claim 4, wherein said retainers form an interlock with flanges of the extrusions in the lateral direction.

6. The cargo carrier according to claim 1, wherein said decking extrusions are secured to the retainers with a snap fit connection.

7. The cargo carrier according to claim 1, wherein said retainers each include separate first and second members, the first member is secured to the decking extrusion, and the second member secures the first member to the cross member.

8. The cargo carrier according to claim 7, wherein said first and second members are each extrusions.

9. The cargo carrier according to claim 7, wherein said first and second members are oriented 90 degrees one from the other.

10. The cargo carrier according to claim 1, wherein the retainers can move relative to the cross members in a longitudinal direction of the cross members.

11. A cargo carrier comprising, in combination:
a plurality of laterally extending and longitudinally spaced apart cross members;
a plurality of longitudinally extending decking extrusions supported on the cross members and forming a cargo deck;
retainers securing the decking extrusions to the cross members;
wherein the retainers limit vertical relative movement between the decking extrusions and the cross members;
wherein the retainers permit longitudinal relative movement between the decking extrusions and the cross members; and
wherein said retainers each include separate first and second members, the first member is secured to the decking extrusion, and the second member secures the first member to the cross member; and
wherein said first members are secured to the decking extrusions with a snap fit connection and the second members are secured to the cross members with a snap fit connection.

12. A cargo carrier comprising, in combination:
a plurality of laterally extending and longitudinally spaced apart cross members;
a plurality of longitudinally extending decking extrusions supported on the cross members and forming a cargo deck;
retainers securing the decking extrusions to the cross members;
wherein the retainers limit vertical relative movement between the decking extrusions and the cross members;
wherein the retainers permit longitudinal relative movement between the decking extrusions and the cross members and at least one end of the decking extrusions is provided with a gap so that the decking extrusions can move in the longitudinal direction;
laterally extending end beams located at longitudinal ends of the decking extrusions,
end retainers securing the decking extrusions to the end beams; and
wherein the end retainers limit vertical relative movement between the decking extrusions and the end beams, and permit longitudinal relative movement between the decking extrusions and the end beams.

13. A cargo carrier comprising, in combination:
a plurality of laterally extending and longitudinally spaced apart cross members;
a plurality of longitudinally extending decking extrusions supported on the cross members and forming a cargo deck;
retainers securing the decking extrusions to the cross members;
wherein the retainers limit vertical relative movement between the decking extrusions and the cross members;
wherein the retainers permit longitudinal relative movement between the decking extrusions and the cross members and at least one end of the decking extrusions is provided with a gap so that the decking extrusions can move in the longitudinal direction;
wherein the retainers each include separate first and second members, the first member is secured to the decking extrusion with a snap-fit connection, and the second member secures the first member to the cross member with a snap fit connection; and wherein said first and second members are each extrusions.

14. The cargo carrier according to claim 13, wherein said first and second members are oriented 90 degrees one from the other.

15. The cargo carrier according to claim 13, wherein said first and second members each comprise aluminum.

16. The cargo carrier according to claim 13, wherein said first member is generally inverted-U-shaped in cross-section having a top wall and a pair of side walls downwardly extending from edges of the top wall, and a protrusion outwardly extending from each of the sidewalls and interlocking with flanges of the decking extrusions.

17. The cargo carrier according to claim 16, wherein said first member also has a pair of legs downwardly extending from the top wall between the side walls, and the legs have a vertical length greater than the vertical length of the side walls.

18. The cargo carrier according to claim 13, wherein said second member is generally inverted-U-shaped in cross-section having a top wall and a pair of side walls downwardly extending from edges of the top wall, and a protrusion inwardly extending from each of the sidewalls and interlocking with flanges of the cross members.

19. The cargo carrier according to claim 13, further comprising laterally extending end beams located at longitudinal ends of the decking extrusions, end retainers securing the decking extrusions to the end beams, the end retainers limit vertical relative movement between the decking extrusions and the end beams, and permit longitudinal relative movement between the decking extrusions and the end beams.

20. A platform semi-trailer comprising, in combination:
a plurality of laterally extending and longitudinally spaced apart cross members;
a plurality of longitudinally extending decking extrusions supported on the cross members and forming a cargo deck;
retainers securing the decking extrusions to the cross members;
wherein the retainers limit vertical relative movement between the decking extrusions and the cross members;
wherein the retainers permit longitudinal relative movement between the decking extrusions and the cross members and at least one end of the decking extrusions is provided with a gap so that the decking extrusions can move in the longitudinal direction; and
wherein said retainers each include separate first and second members, the first member is secured to the decking extrusion with a snap-fit connection, and the second member secures the first member to the cross member with a snap fit connection.

21. A cargo carrier comprising, in combination:
a plurality of spaced apart cross members;
a plurality of decking extrusions supported on the cross members and extending perpendicular to the cross members to form a cargo deck;
retainers securing the decking extrusions to the cross members;
wherein the retainers limit vertical relative movement between the decking extrusions and the cross members;
wherein the retainers can move relative to the cross members in a longitudinal direction of the cross members; and wherein the retainers are secured to the cross members with a snap fit connection.

22. The cargo carrier according to claim 21, wherein the cross members, the decking extrusions, retainers are formed as separate components, and wherein the decking extrusions are secured to the retainers.

23. The cargo carrier according to claim 21, wherein the decking extrusions are secured to the retainers with a snap fit connection.

24. The cargo carrier according to claim 21, wherein the retainers each have a pair of walls, protrusions extending from each of the walls and interlocking with flanges of the decking extrusions, and a pair of legs downwardly extending from the top wall between the side walls, and wherein the legs have a vertical length greater than the vertical length of the side walls.

25. A cargo carrier comprising, in combination:
a plurality of spaced apart cross members;
wherein the cross members are I-beams having a web connecting upper and lower flanges;
a plurality of decking extrusions supported on the cross members and extending perpendicular to the cross members to form a cargo deck;
retainers securing the decking extrusions to the cross members;
wherein the retainers limit vertical relative movement between the decking extrusions and the cross members;
wherein the retainers permit movement of the decking extrusions relative to the cross members in a longitudinal direction of the decking extrusions;
wherein the cross members, the decking extrusions, and the retainers are formed as separate components;
wherein the retainers are secured to upper flanges of the cross members;
wherein the retainers are secured to at least one of the cross members and the decking extrusions with a snap-fit connection; and
wherein the retainers are secured to the cross members without the use of threaded fasteners.

26. The cargo carrier according to claim 25, wherein the retainers can move relative to the cross members in a longitudinal direction of the cross members.

27. A cargo carrier comprising, in combination:
a plurality of spaced apart cross members;
a plurality of decking extrusions supported on the cross members and extending perpendicular to the cross members to form a cargo deck;
retainers securing the decking extrusions to the cross members;
wherein the retainers limit vertical relative movement between the decking extrusions and the cross members;
wherein the decking extrusions are secured to the retainers with a snap fit connection; and
wherein the retainers are sized and shaped to resiliently deflect when the retainers and the decking extrusions are secured to one another and the decking extrusions are sized and shaped to avoid resilient deflection when the retainers and the decking extrusions are secured to one another.

28. The cargo carrier according to claim 27, wherein the retainers each have a pair of walls, protrusions extending from each of the walls and interlocking with flanges of the decking extrusions, and a pair of legs downwardly extending from the top wall between the side walls, and wherein the legs have a vertical length greater than the vertical length of the side walls.

29. A cargo carrier comprising, in combination:
a plurality of spaced apart cross members;
a plurality of decking extrusions supported on the cross members and extending perpendicular to the cross members to form a cargo deck;
retainers securing the decking extrusions to the cross members;
wherein the retainers limit vertical relative movement between the decking extrusions and the cross members;
wherein the retainers can move relative to the cross members in a longitudinal direction of the cross members; and
wherein each of the retainers engages only one of the decking extrusions and is located entirely between lateral sides of the only one of the decking extrusions and entirely beneath the only one of the decking extrusions.

30. The cargo carrier according to claim 29, wherein the retainers permit movement of the decking extrusions relative to the cross members in a longitudinal direction of the decking extrusions.

* * * * *